June 2, 1964 J. BARTOLOTTA 3,135,239
COLLAPSIBLE COMMUNITY MULTI-DWELLING BIRDHOUSE
Filed Aug. 22, 1963 5 Sheets-Sheet 1

INVENTOR.
Joseph Bartolotta
BY
Polachek & Saulsbury
ATTORNEYS.

June 2, 1964 J. BARTOLOTTA 3,135,239
COLLAPSIBLE COMMUNITY MULTI-DWELLING BIRDHOUSE
Filed Aug. 22, 1963 5 Sheets-Sheet 2

INVENTOR.
Joseph Bartolotta
BY
Polacek & Saulsbury
ATTORNEYS.

June 2, 1964  J. BARTOLOTTA  3,135,239
COLLAPSIBLE COMMUNITY MULTI-DWELLING BIRDHOUSE
Filed Aug. 22, 1963  5 Sheets-Sheet 3

INVENTOR.
Joseph Bartolotta
BY Polachek & Saulsbury
ATTORNEYS.

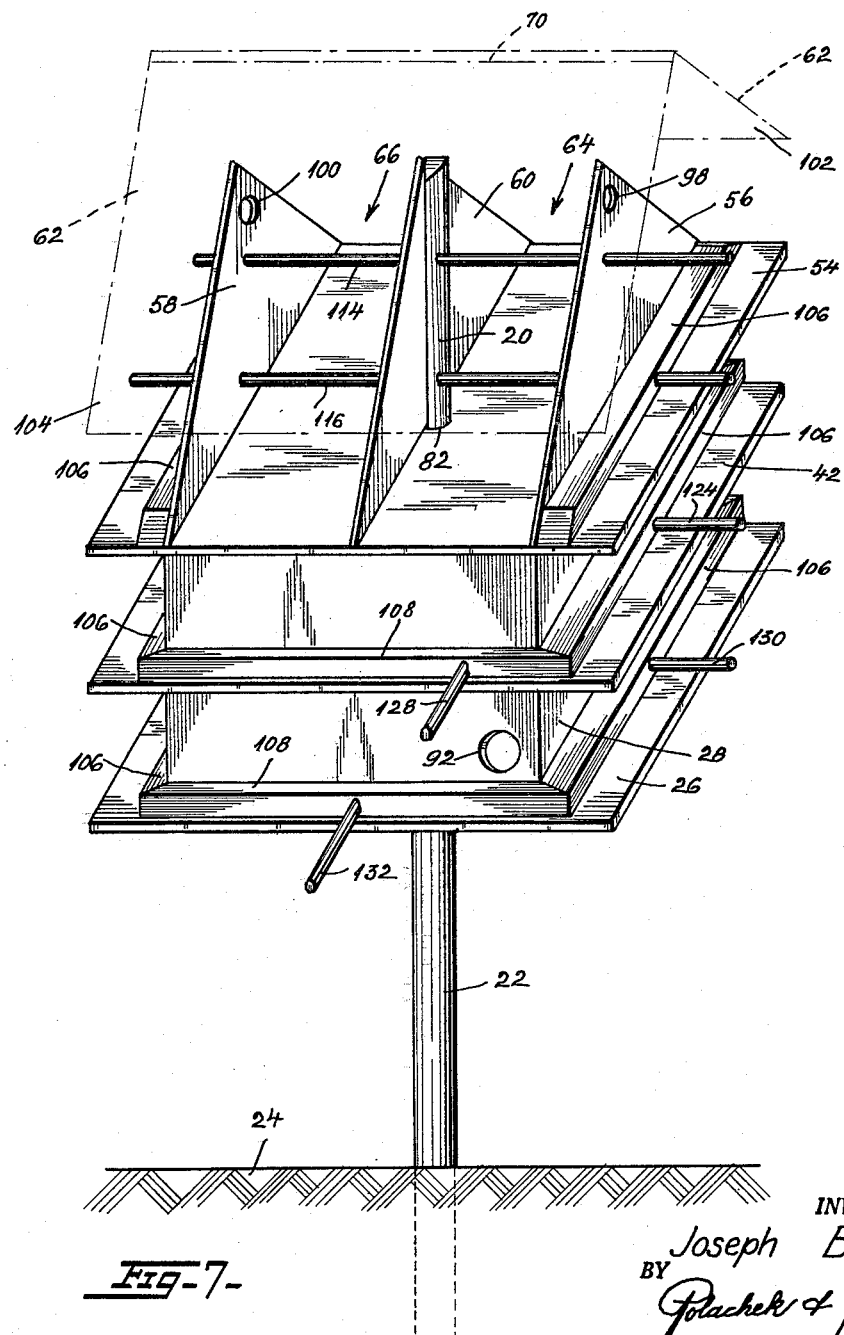
Fig-7-

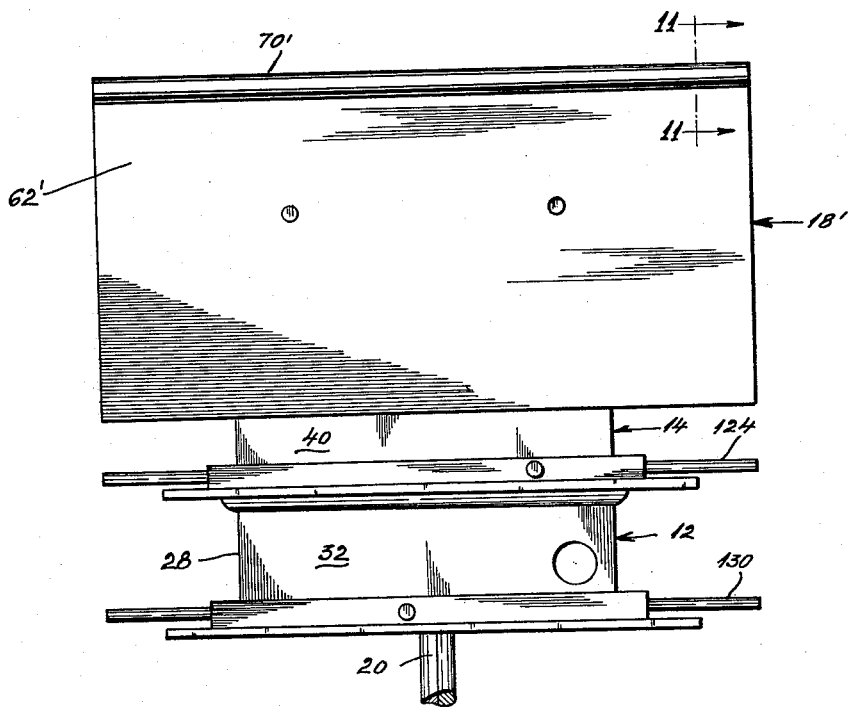
Fig-10-
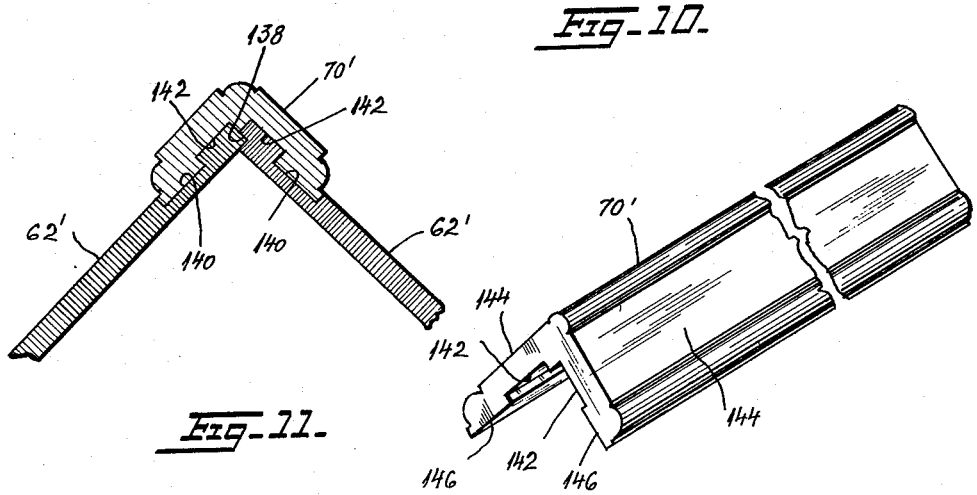
Fig-11-
Fig-12-
INVENTOR.
Joseph Bartolotta

United States Patent Office 3,135,239
Patented June 2, 1964

3,135,239
COLLAPSIBLE COMMUNITY MULTI-DWELLING BIRDHOUSE
Joseph Bartolotta, 2082 Prospect Ave., Bronx, N.Y.
Filed Aug. 22, 1963, Ser. No. 303,847
8 Claims. (Cl. 119—23)

This invention relates generally to bird houses and more particularly to new and useful improvements in a knock-down community multi-dwelling bird house.

A principal object of the invention is to provide a knock-down bird house that is easily assembled and disassembled for cleaning purposes.

Another object is to provide a multi-story bird house with openings for ingress and exit of the birds and with runways and perches adjacent the openings.

A further object of the invention is to provide a knock-down house wherein the floors, walls and roof are rigidly and grmly interlocked preventing sagging and deflection thereof.

Still another object of the invention is to provide a bird house of this kind that has a generally pleasing house-like appearance and that can be readily supported on a pipe or tubular member remote from the ground.

A still further object is to provide a knock-down bird house that can be shipped and stored in collapsed condition and readily set up by the customer.

Other objects of the invention are to provide a knock-down bird house that is simple in construction, inexpensive to manufacture and substantially weatherproof.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 7 is a side perspective view of the bird house shown supported on a pipe inserted in the ground and showing the roof structure in dot-dash lines.

FIG. 10 is a view similar to FIG. 2 showing a modified joint between the top or apex end of the panels constituting the gable roof.

FIG. 11 is a vertical sectional view taken on the line 11—11 of FIG. 10.

FIG. 12 is a perspective view of the angular joint member shown in FIG. 10, parts being broken away.

Figure 1:
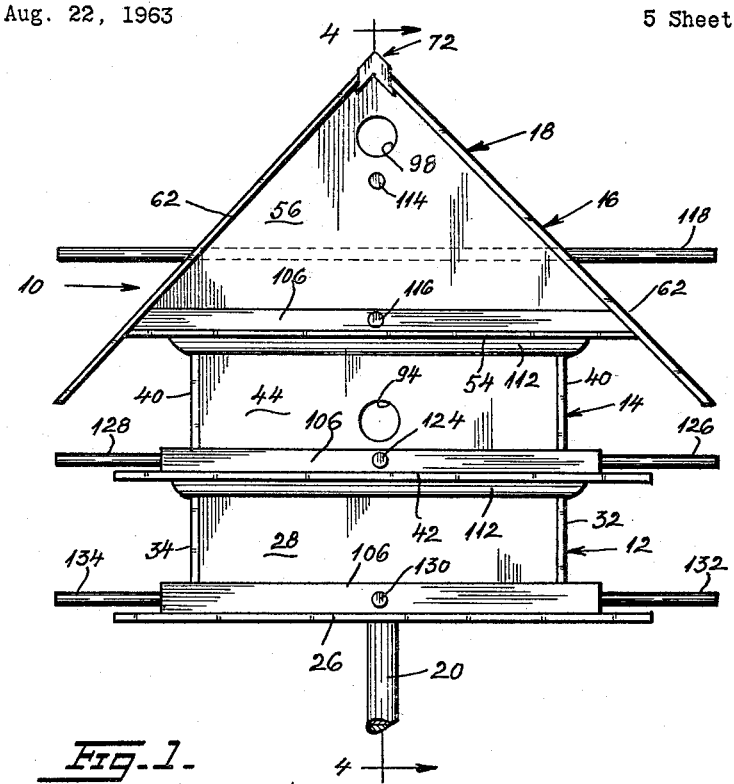
FIG. 1 is a front elevational view of a bird house embodying the invention, parts being broken away.
Figure 2:
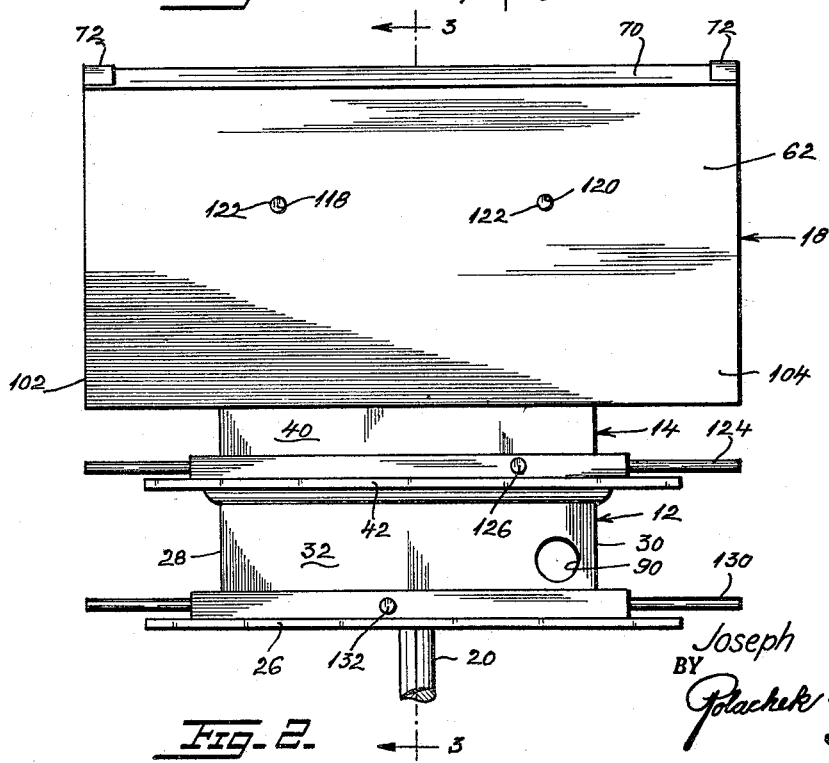
FIG. 2 is a side elevational view thereof.

Referring more in detail to the drawings, a bird house embodying the invention is illustrated and designated generally at 10. The bird house is preferably formed of wood but may be built of plastic or any other suitable material.

The bird house is shown as constituted by a first floor 12, a second floor 14 and an attic 16 with a gabled roof 18. A wooden post 20 depends from the center of the bird house and is adapted to be inserted into a metal pipe 22 extending upwardly from the ground 24 to support the bird house remote from the ground so as to accommodate so as to accommodate of species of birds.

The first floor structure 12 includes a floor 26, a front wall 28, a rear wall 30 and side walls 32 and 34. A partition wall 36 extends from side wall 32 to side wall 34 centrally thereof thereby forming compartments 38 and 40, constituting nesting areas.

The second floor structure 14 includes a floor 42, a front wall 44, a rear wall 46 and side walls 48, 48. A partition wall 49 extends between the side walls 48, 48 centrally thereof thereby forming compartments 50 and 52.

The floors of the first and second floor structures are square and the walls are rectangular in configuration, the floors extending outwardly of the walls.

Figure 3:
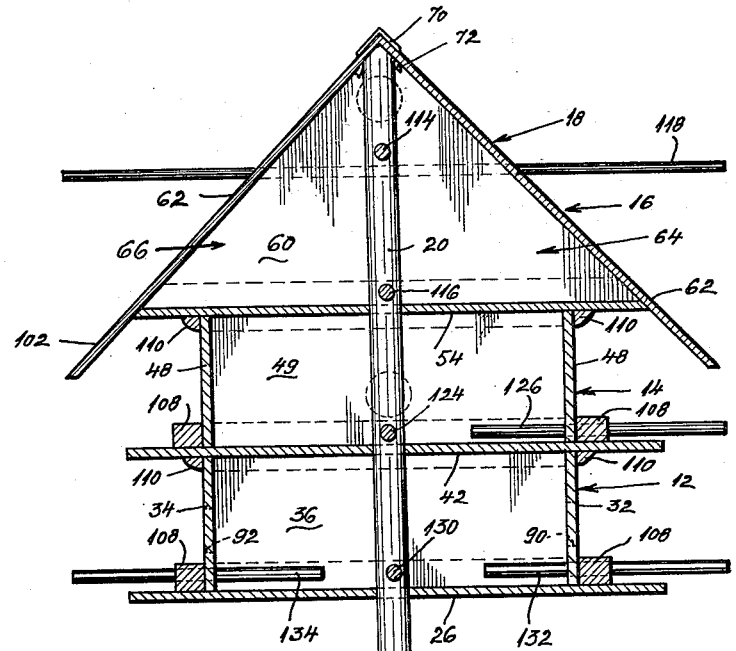
FIG. 3 is a vertical sectional view taken on the line 3—3 of FIG. 2.
Figure 4:
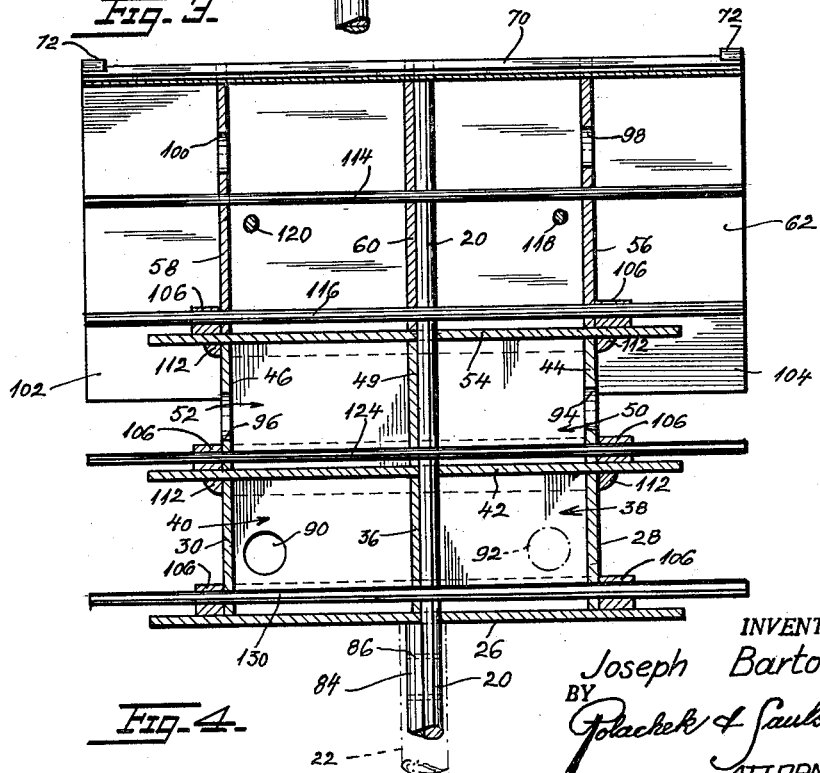
FIG. 4 is a vertical sectional view taken on the line 4—4 of FIG. 1.

The attic 16 includes a floor 54, a front wall 56 and a rear wall 58. A partition wall 60 extends between the panels 62, 62 constituting the gable roof 18, centrally thereof, forming compartments 64, 66. The walls 56, 58 and 60 are triangular in configuration. Floor 54 extends outwardly of the front, rear and side walls of the first and second floor structures and is commensurate with the bottom edges of the front wall 56 and rear wall 58 of the attic as will be seen in FIGS. 3 and 4. The panels 62 constituting the gable roof 18 are secured together at the apex end of the roof by means of an elongated angular metal strip 70. The strip 70 is interlocked to the panels by means of an angular socketed bracket 72 at each end of the strip. The bracket 72 comprises an angular strip 74 inverted V-shaped in cross section and a second similar strip 76 spaced from strip 74, the strips being joined at their adjacent ends by a crosspiece 78. The space between the bodies of the strips provides a socket opening 80 to receive the adjacent end of the elongated strip 70.

The floors 26, 42, 54 are formed with central semicircular openings 82 to receive the post 20 which extends to the apex end of the roof 18. Post 20 is semicircular in cross section to permit it to extend through the openings 50 and the post below the floor 26 has a semicircular strip 84 fastened thereto by wooden plugs 86, forming a round post portion for insertion into the supporting pipe 22.

In accordance with the invention, round openings 90 and 92 are provided in the side walls 32 and 34, respectively, of the first floor 12, the opening 90 being disposed close to the rear wall 30 and leading to compartment 40 and the opening 92 close to the front wall 28 leading to compartment 38. Round openings 94 and 96 are also provided in the front and rear walls 44 and 46, respectively, of the second floor structure 14, close to floor 42, leading to compartments 50 and 52, respectively. Round openings 98 and 100 are provided in the front and rear walls 56 and 58, respectively, of the attic structure 16, near the top apex ends of the walls, leading to compartments 64 and 66. The openings provide ingress or entrance to the compartments or nesting areas 38, 40, 50, 52, 64, 66 of the house. The openings 98 and 100 are situated in the apexed ends of the attic walls directly under the projecting eaves 102 and 104 of the roof 18 thereby lessening somewhat the liability of rain water entering through the openings 98 and 100.

Elongated strips of wood 106 square in cross section are loosely laid on the upper surfaces of floors 26, 42 and 54 at the juncture of the front walls and rear walls with said floors, outwardly of the front and rear walls. These strips constitute runways for landing stages for the birds. Similar runways 108 are provided at the junctures of the floors 26 and 42 with the side walls 32, 34 and 48, outwardly of the side walls.

Wooden molding strips 110 are preferably provided at the junctures of the floors 42 and 54 with the side walls 32, 34 and 48 on the bottom surfaces of the floors outwardly of the side walls. Similar strips of molding 112 are also provided at the junctures of the floors 42 and 54 with the front and rear walls 28, 30, 44 and 46 on the bottom surfaces of the floors outwardly of the front and rear walls. The molding strips may be secured by adhesive or nails or the like.

The invention contemplates providing perch sticks, along with the runways 106 and 108, for supporting the birds. In FIG. 7, upper and lower wooden elongated perch sticks 114 and 116, respectively, are shown extending from front to rear of the house, loosely through aligned holes in the attic walls 56, 58 and 60 and through post 20, the sticks protruding outwardly of the front and rear walls 56, and 58, respectively, and extending across the compartments 64 and 66 therein. A second pair of perch sticks 118 and 120 extend loosely through a pair of holes 122 in the panels 62, 62, along compartments 64 and 66.

Figure 5:
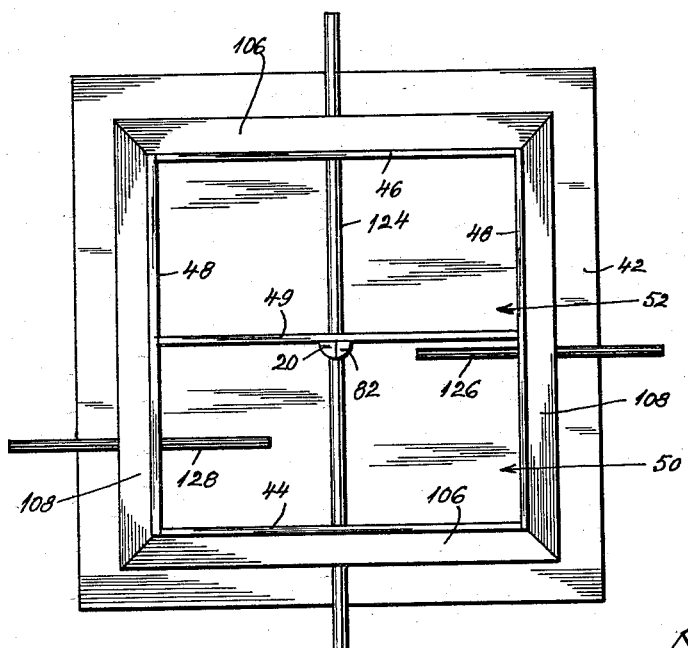
FIG. 5 is a top plan view of the second floor of the bird house, the attic structure being removed.
Figure 8:
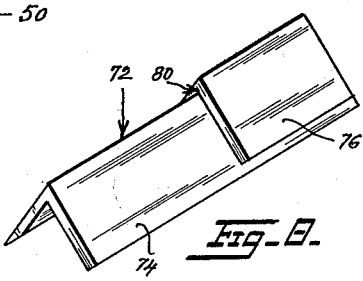
FIG. 8 is a perspective view of the roof bracket.
Figure 9:
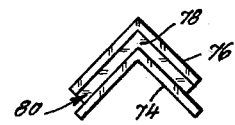
FIG. 9 is an end view thereof.
Figure 6:
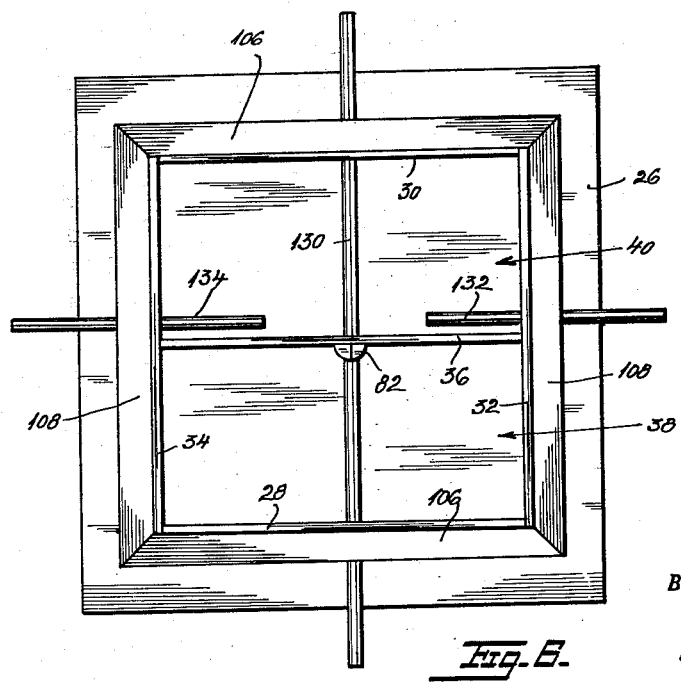
FIG. 6 is a top plan view of the first floor, the second floor structure and attic floor structure being removed.

An elongated perch stick 124 extends from front to rear of the house and loosely through aligned holes in the runway 106, partition wall 49, rear wall 46, rear runway 106, and protrudes beyond the front and rear ends of the floor 42. The stick 124 spans compartments 50 and 52 in the second floor structure 14. A shorter perch stick 126 extends laterally through a hole in the right-hand side runway 108 as viewed in FIG. 5 and through an aligned hole in the adjacent side wall 48. Stick 126 extends into the compartment 50 and extends outwardly beyond the side end edge of floor 42. A second short perch stick 128 extends laterally through a hole in the opposite left-hand side runway 108 and an aligned hole in the adjacent side wall 48. Stick 126 extends into the compartment 50 centrally thereof on the same plane as the stick 124 and stick 126, which latter stick is disposed close to the partition wall 49.

An elongated perch stick 130 extends from front to rear of the first floor structure and loosely through aligned holes in the front runway 106, front wall 28, partition wall 36, rear wall 30 and rear runway 106. Stick 130 extends beyond the front and rear end edges of the floor 26. Opposed shorter perch sticks 132 and 134 extend loosely through the side walls 32 and 34, respectively, and through the adjacent runways 108, adjacent the partition wall 36. The sticks 132 and 134 extend into the compartment 40 and outwardly beyond the side end edges of the floor 26.

In FIGS. 10 to 12, inclusive, a modified form of joint at the top or apex ends of the panels 62', 62', forming the gable roof 18' is shown. In this form, the upper end of one of the panels is formed with a notch 138 to receive the end of the other panel in interlocking relationship. The outer surfaces of such meeting ends of the panels are formed with grooves 140, 140 extending the length of the panels. An elongated angular inverted V-shaped metal strip 70' is placed over the meeting ends of the panels and interlocked therewith by means of adjacent grooves 142 formed in the sides 144 of the strip, receiving the adjoining ends of the panels. The grooves form shoulders 146 along the long edges of the sides 144, which shoulders are seated in the grooves 140, 140 in the panels. The metal strip 70' is thereby interlocked in fixed position on top of the panels 62', 62'.

At the end of the season, the bird house may be readily knocked down by merely withdrawing the perch sticks and the central post 20 for cleaning and storage. Since the bird house is relatively unbreakable, it is a simple matter to store the same until the next nesting season arrives.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A bird house comprising a floor structure, and an attic structure superimposed on the floor structure, said structures supported on a central upright post extending upwardly therethrough, said floor structure including a floor with a central opening to receive the post, front, rear and side walls, said attic structure having a floor, front and rear walls, said walls having openings for ingress and egress of birds, a roof over said attic structure, and perch sticks extending loosely through aligned holes in the front and rear walls and in the roof for interlocking the structures to the post.

2. A bird house comprising a first floor structure, a second floor structure superimposed thereon and an attic structure superimposed on the second floor structure, said structures supported on a central upright post extending therebelow, said first floor structure including a floor with a central opening to receive the post, front, rear and side walls and a partition wall centrally across the floor dividing the structure into nesting compartments, said attic structure having a floor, front and rear walls and a partition wall centrally across the floor dividing the structure into nesting compartments, said walls having openings leading to said compartments for ingress and egress of birds, a roof over said attic structure, and perch sticks extending loosely through aligned holes in the walls and in the roof for interlocking the structures to the post.

3. A bird house comprising a first floor structure, a second floor structure superimposed thereon and an attic structure superimposed on the second floor structure, said structures supported on a central upright post extending therebelow, said first floor structure including a floor with a central opening to receive the post, front, rear and side walls and a partition wall centrally across the floor dividing the structure into nesting compartments, said attic structure having a floor, front and rear walls and a partition wall centrally across the floor dividing the structure into nesting compartments, said walls having openings leading to said compartments for ingress and egress of birds, a roof over said attic structure, perch sticks extending loosely through aligned holes in the walls and in the roof for interlocking the structures to the post, and other perch sticks extending loosely through holes in the side walls into the nesting compartments.

4. A bird house comprising a first floor structure, a second floor structure superimposed thereon and an attic structure superimposed on the second floor structure, said structures supported on a central upright post extending therebelow, said first floor structure including a floor with a central opening to receive the post, front, rear and side walls and a partition wall centrally across the floor dividing the structure into nesting compartments, said attic structure having a floor, front and rear walls and a partition wall centrally across the floor dividing the structure into nesting compartments, said walls having openings leading to said compartments for ingress and egress of birds, a roof over said attic structure, perch sticks extending loosely through aligned holes in the walls and in the roof for interlocking the structures to the post, and other perch sticks extending loosely through holes in the side walls into the nesting compartments, said floors extending outwardly around the walls, and strips loosely mounted on the outwardly extending portions of the floors outwardly of and adjacent to the base of the walls, said strips constituting runways for the birds.

5. A bird house comprising a first floor structure, a second floor structure superimposed thereon and an attic structure superimposed on the second floor structure, said structures supported on a central upright post extending therebelow, said first floor structure including a floor with a central opening to receive the post, front, rear and side walls and a partition wall centrally across the floor dividing the structure into nesting compartments, said attic structure having a floor, front and rear walls and a partition wall centrally across the floor dividing the structure into nesting compartments, said walls having openings leading to said compartments for ingress and egress of birds, a roof over said attic structure, perch sticks extending loosely through aligned holes in the walls and in the roof for interlocking the structures to the post, and other perch sticks extending loosely through holes in the side walls into the nesting compartments, said floors extending outwardly around the walls, and strips loosely mounted on the outwardly extending portions of the floors, outwardly of and adjacent to the base of the walls, said strips having holes to receive the ends of the perch sticks, said strips constituting runways for the birds.

6. A bird house comprising a first floor structure, a second floor structure superimposed thereon and an attic structure superimposed on the second floor structure, said structures supported on a central upright post extending therebelow, said first floor structure including a floor with a central opening to receive the post, front, rear and side walls and a partition wall centrally across the floor dividing the structure into nesting compartments, said attic structure having a floor, front and rear walls and a partition wall centrally across the floor dividing the structure into nesting compartments, said walls having openings leading to said compartments for ingress and egress of birds, a roof over said attic structure, perch sticks extending loosely through aligned holes in the walls and in the roof for interlocking the structures to the post, said attic structure including a gable roof supported on the side walls of the second floor structure, said roof including tapering panels, an elongated angle member connecting the edges of the panels at the apex end of the roof, and brackets interlocking the ends of the angle member with the apex ends of the panels.

7. A bird house comprising a first floor structure, a second floor structure superimposed thereon and an attic structure superimposed on the second floor structure, said structures supported on a central upright post extending therebelow, said first floor structure including a floor with a central opening to receive the post, front, rear and side walls and a partition wall centrally across the floor dividing the structure into nesting compartments, said attic structure having a floor, front and rear walls and a partition wall centrally across the floor dividing the structure into nesting compartments, said walls having openings leading to said compartments for ingress and egress of birds, a roof over said attic structure, perch sticks extending loosely through aligned holes in the walls and in the roof for interlocking the structures to the post, said attic structure including a gable roof supported on the side walls of the second floor structure, said roof including tapering panels, an elongated angle member connecting the edges of the panels at the apex end of the roof, brackets interlocking the ends of the angle member with the apex ends of the panels, said panels having aligned holes therein, and perch sticks extending loosely through said holes ontwardly of the panels.

8. A bird house comprising a first floor structure, a second floor structure superimposed thereon and an attic structure superimposed on the second floor structure, said structure supported on a central upright post extending therebelow, said first floor structure including a floor with a central opening to receive the post, front, rear and side walls and a partition wall centrally across the floor dividing the structure into nesting compartments, said attic structure having a floor, front and rear walls and a partition wall centrally across the floor dividing the structure into nesting compartments, said walls having openings leading to said compartments for ingress and egress of birds, a roof over said attic structure, perch sticks extending loosely through aligned holes in the walls and in the roof for interlocking the structures to the post, said attic structure including a gable roof supported on the side walls of the second floor structure, said roof including tapering panels joined at their upper ends, said jointure including a notch in the top end of one of the panels receiving the top end of the other panel, said panels having grooves along their upper ends closely spaced from the notch and end joint, and an elongated inverted V-shaped metal strip on top of the meeting top ends of the panels, said strip having grooves along the inner surfaces of the sides thereof receiving the jointed top ends of the panels, and shoulders on the inner surfaces of the long edges of the strip interlocked in the grooves in the panels.

References Cited in the file of this patent
UNITED STATES PATENTS

| | | |
|---|---|---|
| 1,516,381 | Erickson | Nov. 18, 1924 |
| 1,916,878 | Anklam | July 4, 1933 |
| 2,184,633 | Copeman | Dec. 26, 1939 |